United States Patent Office 2,970,978
Patented Feb. 7, 1961

2,970,978

PLASTICIZED SYNTHETIC RESIN AND MASTIC TILE PRODUCT MADE THEREFROM

Paul O. Powers, Clairton, Pa., assignor to Pennsylvania Industrial Chemical Corporation, Clairton, Pa., a corporation of Pennsylvania No Drawing. Filed Aug. 6, 1956, Ser. No. 602,462

2 Claims. (Cl. 260—33.6)

This invention relates to tile resins and tile binders especially adapted for use in the production of mastic, or asphalt, tile.

In the production of asphalt tile some of the specifications, such as those of Federal Specification SS–T–306b, may be met without great difficulty. It has generally been true, however, that it is with some difficulty that mastic tile satisfactorily and economically meets the specifications for resistance to vegetable oils, such as cottonseed or lard oils, to kerosene, and to mild alkalies, such as trisodiumphosphate solution, created by, for example, the Asphalt Tile Institute.

The resins available heretofore for use as binders for mastic tile have not been entirely satisfactory in the latter connection. Polystyrene base binders have good color and good color stability but they do not achieve the desired grease resistance. Modified phenolic resins, such as the modified phenolic-maleic resins, do give a satisfactory degree of grease resistance but they still lack desired resistance to light, and the colors of the finished tile are often not as bright as desired. In the past blown and bodied oils have been used with hydrocarbon resins to produce tile having satisfactory grease resistance but they show inadequate resistance to alkali.

With further reference to hydrocarbon resins, when plasticized to supply tile binders some exhibit excellent resistance to kerosene but in general they are high melting, and when sufficient plasticizer has been added to give a tile that is satisfactory, for instance with respect to indentation, the grease resistance does not meet accepted standards.

Partly because of such deficiencies of the previous tile resins and binder compositions of them with plasticizers, especially with respect to the development of greaseproof asphalt tile, this type of mastic floor covering has not up to this time achieved the commercial acceptance that would normally have been expected due, largely, to the unavailability of a reasonably inexpensive binder capable of producing a tile that is satisfactorily greaseproof and alkali resistant.

It is among the objects of this invention to provide tile resins and plasticized binders thereof productive of mastic tile that meet standard specifications for resistance to mineral and vegetable oils and to alkali; that are adapted likewise to the production of tiles of bright color, and that possess other tile binder desiderata, such as color stability under exposure to light.

It is among other objects of the invention to provide tile resins, and binders compounded therefrom, for the production of asphalt tile comprising, in addition to thermoplastic binder, fibrous material, such as asbestos, filler, such as limestone, and pigment, that are characterized by meeting the specifications for grease and alkali resistance of the Asphalt Tile Institute; that may be plasticized with readily available substances; that may, if deisred, be used as extenders for vinyl resin binders: and that are readily produced from available materials and are attractively inexpensive.

The invention is predicated upon my discovery that its objects are obtained by copolymer resins of relatively high melting point formed from monomers of styrene and monomers containing the group $CH_2=CHC-$, examples being acrylonitrile, acrylamide and methyl vinyl ketone. Such copolymers are, in accordance with the invention, cut back to about 100° to 110° C. melting point with substantially non-volatile extenders to provide tile resins that may then be converted to tile binders by the addition of plasticizers.

In the case of acrylonitrile, I have found that less than 5 percent of it in the copolymer results in a resin and tile binder that gives tile of inadequate grease resistance. I have found also that there is no advantage in having more than about 10 percent of acrylonitrile in the copolymer with styrene.

The copolymers of this invention may be made by procedures familiar to those concerned with the production of polymers, examples of which will appear hereinafter.

The high melting copolymer resins of this invention may be cut back to a melting point of about 100° to 110° C. by a variety of extenders, or plasticizers such, for example, as those commonly used with vinyl chloride resins including, for instance, di-octyl phthalate and tricresyl phosphate, and such blends may then be softened further (as to 70° C.) to produce tile binders for making greaseproof tile. For the latter purpose a particularly useful softener is supplied by polymerizing styrene with clay and stripping the product to a resin of about 20° C. melting point; such a product is available on the market as Piccolastic A-25 (a soft styrene polymer), or Aromatic Plasticizer 25, which latter has a high degree of aromaticity that adapts it particularly to the plasticizing of the copolymers of this invention, and it contributes to the production of mastic tile of excellent light stability. For some purposes, as where optimum resistance is not requisite, Piccolastic A-25 or other highly aromatic hydrocarbon plasticizer may be replaced in part by coumarone-idene or other hydrocarbon resins of 60° to 100° C. softening point. Other substantially non-volatile plasticizers useful in the practice of the invention are described in connection with the following examples.

The tile resins of this invention may be used in the production of mastic tile according to conventional and well known procedures. Such tile are, broadly considered, constituted of fibrous materials, such as asbestos fiber, fillers, such as limestone, and pigments.

*Example 1.*—A mixture of 94 parts by weight of 99.6 percent styrene and 6 parts of acrylonitrile was added during 4 hours to an equal weight of Hi Solv 471 oil (a high boiling aromatic oil containing approximately 85 percent to 90 percent aromatic hydrocarbons principally methylnaphthalenes) heated to 160° to 165° C., following which the mixture was refluxed at 165° C. for 44 hours. The product was then steam stripped to remove the solvent and any unreacted monomers, resulting in a yield of 99 percent of copolymer resin based on the monomers. This resin had a melting point of 141° C. It contained 5.4 percent of acrylonitrile based upon the nitrogen content as determined by the Kjeldahl method. 70 parts of this resin was blended with 24 parts of Atlantic 14 oil, a naphthenic mineral oil, and 6 parts of limed tall oil pitch to form tile binder of about 80° C. melting point. Tile made from it gave an initial, or blank, scratch of 0.062 by the Taber scratch test of the Asphalt Tile Institute specification for grease resistant asphalt tile. After exposure during 24 hours to kerosene, cottonseed oil and trisodiumphosphate solution in accordance with those specifications the tiles showed, respectively, 0.076, 0.076 and 0.068 scratch width. Thus the tile made from this binder admirably meet the specifications for grease resistance and alkali resistance since the specification allows double the blank scratch width on the Taber test. It may be noted that it is not considered in the trade good practice to market tile with scratch widths that are close to the specification limit, thus showing the desirable nature of the copolymer binders of this invention. The tile likewise showed an initial penetration of but 7.1 mils.

*Example 2.*—In this instance 93 parts of 99 percent styrene and 7 parts of acrylonitrile were refluxed at 165° C. for 44 hours. The resin produced had a melting point of 136° C. It was then blended with 20 percent Hercolyn, a hydrogenated methyl abietate, 30 parts of Picco T–100 (a resin of about 100° C. melting point made by polymerization with acid catalysts of deep cracked petroleum distillates), and 8 parts of HSD oil (a heavy aromatic oil) to produce a binder of 108° C. melting point which was then milled with 15 parts of di-octylphthalate. Tile produced from this binder had entirely satisfactory resistance to kerosene, cottonseed oil and $Na_3PO_4$.

*Example 3.*—90 parts of 99 percent styrene and 10 parts of acrylonitrile mixed with an equal weight of Hi Solv 30 (a pertoleum aromatic solvent boiling in the range 130° to 180° C.) were heated at 165° C. during 48 hours to produce a resin copolymer of 142° C. melting point. The resin was then blended with 30 percent by weight of Piccolastic A–25 and 20 percent of Aromatic Plasticizer 25, which is formed by the condensation of olefins with aromatic hydrocarbons to produce a resin having a softening point of about 25° C. and an aniline point of about 50° C. This blend melted at about 110° C. It was plasticized with 17 percent of di-octylphthalate to form tile binder, and when this binder was mixed with limestone, asbestos fiber and pigments there was produced a tile meeting the grease resistance specifications and having excellent stability to light and good resistance to indentation.

*Example 4.*—93 parts of monomeric styrene (99.6 percent purity) and 7 parts of acrylonitrile were refluxed in Hi Solv 30 (an aromatic hydrocarbon boiling at 130° to 180° C.) for 48 hours at 138° to 145° C. This resin was finished by steaming, and had a melting point of approximately 160° C. When blended, using 52 percent of the 93–7 copolymer with 35 percent by weight of 25° C. melting point coal tar resin (of the coumarone-indene type), and 13 parts by weight of Atlantic No. 14 (naphthenic mineral oil), a tile resin of 108° C. softening point was obtained. This resin was blended with Atlantic No. 14 and limed tall oil, to give a 70° C. melting point binder, which was blended with a filler, consisting of 40 parts of 7–R Asbestos, 55 parts of ground limestone, and 5 parts of pigments, using 23 parts binder and 77 parts filler to give a tile having an initial penetration of 9, and a penetration at 115° C. of 15. The control Taber abrasion of this material was 0.60; the kerosene resistance was 0.070; the cottonseed resistance was 0.086; the trisodium sulphate resistance was 0.066. Thus it will be seen that the tile had excellent resistance to kerosene, vegetable oils, and to alkalis.

*Example 5.*—To 150 parts of water containing, by weight, 6 parts Dresinate 214 (a disproportionated rosin soap designed for use in emulsion polymerization), 93 parts of monomeric styrene and 7 parts of acrylonitrile are added. One part of benzoyl peroxide is then added, and the mixture stirred at 70° C. for 24 hours. The polymer is precipitated by the addition of alcohol and dried. 52 parts of the dry polymer are mixed with 24 parts of Aromatic Plasticizer 25 (an alkylated aromatic hydrocarbon of 25° C. softening point) and Piccolastic A–25 (a soft polymer of styrene). This mixture melts at 105° C., and when blended in the ratio of 8 parts of the above mixture with 12 parts of Aromatic Plasticizer 25 and one part of Methox (dimethoxy ethyl phthalate) it produces a tile binder. When this binder is blender in the ratios 23 parts of binder to 100 parts of filler, a greaseproof tile of initial penetration of 10 mils results, having excellent resistance to kerosene, cottonseed oil, and trisodiumphosphate solution.

The copolymer tile resins of this invention are useful as such in the production of mastic tile but also may be used to confer their desirable properties of resistance to mineral and vegetable oils and alkali upon other binders. In this way more costly binders, such as vinyl chloride resins, may be extended while attaining in addition to economic factors the properties that characterize the invention.

As indicated above, tile having satisfactory greaseproof properties may be made also in accordance with this invention from tile resins produced from styrene copolymerized with acrylamide or methyl vinyl ketone. As to acrylamide, it has been found that copolymers with styrene containing as little as one percent of the amide produce a tile resin that suitably plasticized and compounded with the usual tile constituents gives tile meeting the specifications for resistance to grease and alkali.

Acrylamide is not fully soluble in hydrocarbon diluents but is soluble in ketones which dissolve both the monomer and the copolymer to insure homogeneous reaction.

*Example 6.*—As an example, 97 parts of styrene were refluxed with three parts of acrylamide in cyclohexanone at 140° to 150° C. during 48 hours. Upon evaporation of the solvent there was recovered a high melting copolymer resin. 58 parts of this resin were blended with 42 parts of Piccolastic A–25 to produce a tile resin of 114° C. melting point. This tile resin was further plasticized with 25 parts of Aromatic Plasticizer 25 (a viscous alkylated hydrocarbon) to provide a tile binder of 82° C. melting point. 23 parts of this binder were compounded with asbestos, limestone and pigments and formed into tile which when tested showed excellent resistance to kerosene, cottonseed oil, and trisodiumphosphate solutions.

*Example 7.*—In another instance 99 parts of 99.6 percent pure styrene monomer and one part of acrylamide were copolymerized in the same manner as in the preceeding example and the high melting tile resin was similarly converted into a tile binder, 23 parts of which were compounded with 77 parts of asbestos fiber, limestone and pigment to provide tiles with acceptable resistance to kerosene, cottonseed oil and trisodiumphosphate solution.

I now believe that the useful range of such copolymers of styrene and acrylamide varies between 1 percent and 5 or 7 percent of acrylamide.

*Example 8.*—In the case of methyl vinyl ketone, no special technique is required for mixtures of styrene and methyl vinyl ketone polymerize readily at 140° to 150° C. using a hydrocarbon solvent, such as Hi Solv 30, to yield a clear solution which upon evaporation of the solvent gives a clear high melting resin that can be converted into a satisfactory tile binder by procedures such as those indicated above. This binder likewise is productive of satisfactorily greaseproof tile. I believe now that copolymers of styrene with from 3 to 10 percent of methyl vinyl ketone suffice for the purposes of this invention.

All proportions referred to hereinabove are in parts by weight. The melting or softening points stated are as determined by the ball-and-ring method well known in the resin art.

According to the provisions of the patent statutes, I have explained the principle of my invention and have described what I now consider to represent its best embodiment. However, I desire to have it understood that, within the scope of the appended claims, the invention may be practiced otherwise than as specifically described.

I claim:

1. A tile resin composition for mastic tile consisting essentially of a blend of a high melting point copolymer of styrene and a member of the group consisting of, by weight, 7 to 10 percent of acrylonitrile, 1 to 7 percent of acrylamide, and 3 to 10 percent of methyl vinyl ketone cut back with a substantially non-volatile plasticizing extender to about 70° to 110° C. melting point.

2. As a new article of manufacture, mastic tile of good color stability and grease resistance consisting essentially of fibrous material, filler, pigment, and thermoplastic binder consisting essentially of high melting copolymer of styrene and a member of the group consisting of, by weight, 7 to 10 percent of acrylonitrile, 1 to 7 percent of acrylamide, and 3 to 10 percent of methyl vinyl ketone cut back with a substantially non-volatile plasticizing extender to about 70° to 110° C. melting point.

References Cited in the file of this patent

UNITED STATES PATENTS

| | | |
|---|---|---|
| 2,102,179 | Hopff et al. | Dec. 14, 1937 |
| 2,209,246 | Bauer et al. | July 23, 1940 |
| 2,529,260 | Powers | Nov. 7, 1950 |

UNITED STATES PATENT OFFICE
CERTIFICATION OF CORRECTION

Patent No. 2,970,978                            February 7, 1961

Paul O. Powers

It is hereby certified that error appears in the above numbered patent requiring correction and that the said Letters Patent should read as corrected below.

Column 2, line 30, for "20° C." read -- 25° C. --; line 40, for "coumarone-idene" read -- coumarone-indene --; column 3, line 74, for "blender" read -- blended --.

Signed and sealed this 3rd day of April 1962.

(SEAL)
Attest:

ERNEST W. SWIDER                          DAVID L. LADD

Attesting Officer                            Commissioner of Patents